United States Patent
Van Ert

[19]

[11] Patent Number: 5,928,597
[45] Date of Patent: Jul. 27, 1999

[54] METHOD FOR THERMOFORMING SHEET ARTICLES

[75] Inventor: Jack M. Van Ert, Rochester Hills, Mich.

[73] Assignee: Lear Corporation, Southfield, Mich.

[21] Appl. No.: 08/948,344

[22] Filed: Oct. 9, 1997

[51] Int. Cl.[6] .......................... B29C 51/14; B29C 51/28; B29C 51/42

[52] U.S. Cl. .......................... 264/316; 264/314; 156/222; 425/520; 425/521; 425/389; 425/390

[58] Field of Search .................................. 264/313, 314, 264/316; 156/583.3, 583.8, 222; 425/520, 521, 389, 390

[56] References Cited

U.S. PATENT DOCUMENTS

| | | | |
|---|---|---|---|
| 1,311,342 | 7/1919 | Gloetzner | 264/316 |
| 2,978,008 | 4/1961 | Conti | 156/583.3 |
| 3,580,795 | 5/1971 | Eichenlaub | 156/583.3 |
| 3,964,958 | 6/1976 | Johnston | 156/583.3 |
| 4,267,142 | 5/1981 | Lankheet | 264/510 |
| 5,217,563 | 6/1993 | Niebling et al. | 156/382 |
| 5,378,134 | 1/1995 | Blot et al. | 425/149 |
| 5,425,627 | 6/1995 | Reil et al. | 425/343 |
| 5,427,599 | 6/1995 | Greschner et al. | 425/389 |
| 5,462,786 | 10/1995 | Van Ert | 428/171 |

OTHER PUBLICATIONS

International Search Report for PCT/US98/19991.

*Primary Examiner*—Jan H. Silbaugh
*Assistant Examiner*—Michael Poe
*Attorney, Agent, or Firm*—Brooks & Kushman P.C.

[57] ABSTRACT

A method of thermoforming sheet articles includes: a) heating a sheet article to be thermoformed; b) inserting the heated sheet article into a pressure vessel having first and second vessel halves, wherein each vessel half includes a liquid chamber and a thin shell configured for forming the sheet article to a desired shape; c) closing the pressure vessels such that the sheet article is captured between the thin shells; and d) providing liquid of equal pressure in each liquid chamber to force the thin shells together to form the sheet article to the desired shape and to draw heat away from the thin shells for cooling the sheet article.

8 Claims, 2 Drawing Sheets

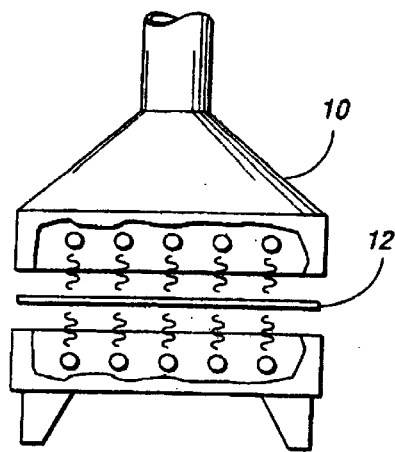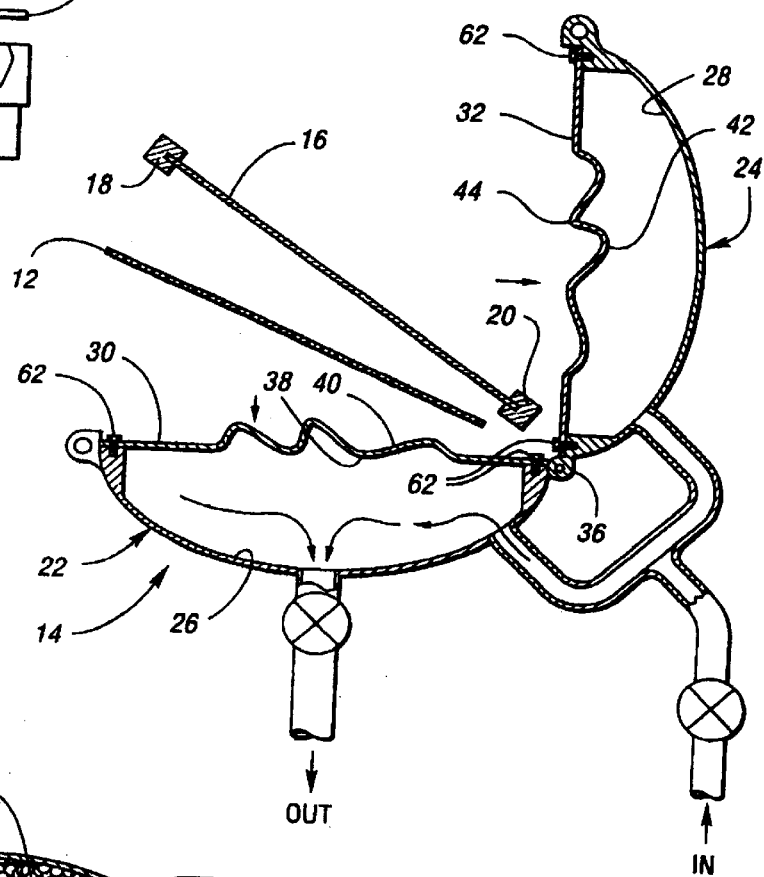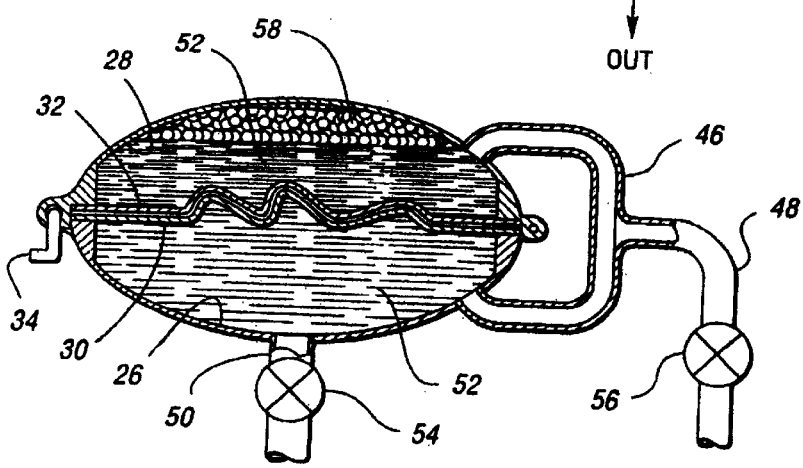

METHOD FOR THERMOFORMING SHEET ARTICLES

TECHNICAL FIELD

The present invention relates to a method and apparatus for thermoforming sheet articles, and more particularly to such a method and apparatus in which low pressure liquid is used in a pressure vessel to pressurize and cool a sheet to be thermoformed.

BACKGROUND OF THE INVENTION

A common method of thermoforming plastic parts is compression molding. Compression molding usually uses solid molding tools, such as epoxy or composite materials cast around a copper cooling line configuration. Compression molding is used for thermoforming of sheet material, and is also used for attaching a cover material to a sheet article as the sheet article is thermoformed.

A significant problem experienced in compression molding is that epoxy or composite cast molds generally include a variety of hot spots on the mold surface which are spaced away from the copper cooling lines as a result of the configuration of the part being formed, or other tool design restrictions. These hot spots in the compression mold require significant cooling time for heat to be drawn away from the mold surface into the nearest cooling lines, which may substantially increase cycle time per part.

Another problem with such structures is that significant tool building time is required, as well as significant costs in preparation of the tool. Also, utilities, such as electricity, and support equipment, such as large hydraulic/electrical presses with water cooling equipment and controls, are required.

Accordingly, it is desirable to provide a method and apparatus for thermoforming sheet articles in which cycle time is reduced, tool preparation time is reduced, tooling costs are reduced, and capital equipment, support equipment and utilities costs and requirements are also reduced.

DISCLOSURE OF THE INVENTION

The present invention overcomes the above-referenced shortcomings of the prior art compression molding process by providing a method and apparatus for thermoforming sheet articles which includes equalized fluid pressurization of opposing fluid chambers of a pressure vessel for forcing thin shells together to form the sheet article to a desired shape while simultaneously directly cooling the thin shells through the fluid in the fluid chambers.

More specifically, the present invention provides a method of thermoforming sheet articles, comprising: a) heating a sheet article to be thermoformed; b) inserting the sheet article into a pressure vessel having first and second vessel halves, wherein each vessel half includes a liquid chamber and a thin shell configured for forming the sheet article to a desired shape; c) closing the pressure vessel such that the sheet article is captured between the thin shells; and d) providing liquid of equal pressure in each liquid chamber to force the thin shells together to form the sheet article to the desired shape and to draw heat away from the thin shells for cooling the sheet article.

Another aspect of the invention provides a pressure vessel for forming preheated sheet articles. First and second vessel halves include first and second liquid chambers formed therein, respectively. First and second thin shells at least partially border the first and second liquid chambers. The first and second thin shells are configured for forming the sheet article to a desired shape when the vessel halves are closed together. The thin shells each include first and second surfaces. A fluid conduit is configured to provide fluid communication between the first and second liquid chambers for equalizing the fluid pressure in the liquid chambers. The thin shells are positioned such that liquid disposed within the liquid chambers directly contacts substantially all of one of the first and second surfaces of the thin shells for drawing heat away from the thin shells for cooling the sheet article.

Numerous applications for the present invention are contemplated within the scope of the present invention. For example, the present invention may be used for securing a cover material to a preheated plastic sheet while forming the plastic sheet, and the invention is applicable to both thermosets and thermoplastic materials.

A significant aspect of the invention is that only low pressure liquid must be provided in the liquid (i.e., liquid pressurized to 5 to 100 p.s.i.) to provide sufficient force for forming the sheet articles. Accordingly, only a low pressure liquid feed line is required for operation.

The thin shells are, preferably, at least partially flexible to allow closing of the pressure vessel halves together over the sheet article prior to pressurization of the liquid chambers with a liquid for forming the sheet article to a desired shape.

In order to reduce the weight of the movable pressure vessel half, light, hard fillers may be provided in the movable liquid chamber for reducing the volume of liquid in the respective vessel half for appropriate weight reduction. The light, hard fillers may comprise a ping-pong ball type device, or hard, styrofoam blocks may be used, or any similar structure.

Accordingly, an object of the invention is to provide an improved method and apparatus for thermoforming sheet articles in which cycle time is reduced, tooling costs are reduced, and capital equipment and utilities costs are reduced.

A further object of the invention is to provide a method of thermoforming sheet articles which comprises providing low pressure liquid in opposing halves of a pressure vessel for pressurizing the sheet article to be formed while simultaneously cooling the sheet article.

Another object of the invention is to provide an apparatus for forming preheated sheet articles in which tooling costs and tool preparation time are substantially reduced.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 shows a schematically arranged sideview of an oven for heating a sheet article in accordance with the present invention;

FIG. 2 shows a schematically arranged sectional side view of a pressure vessel with a sheet article and cover material being inserted therein;

FIG. 3 shows a schematically arranged sectional side view of the pressure vessel of FIG. 2 in the closed position;

DETAILED DESCRIPTION OF THE PREFERRED EMBODIMENT

Figure 4:
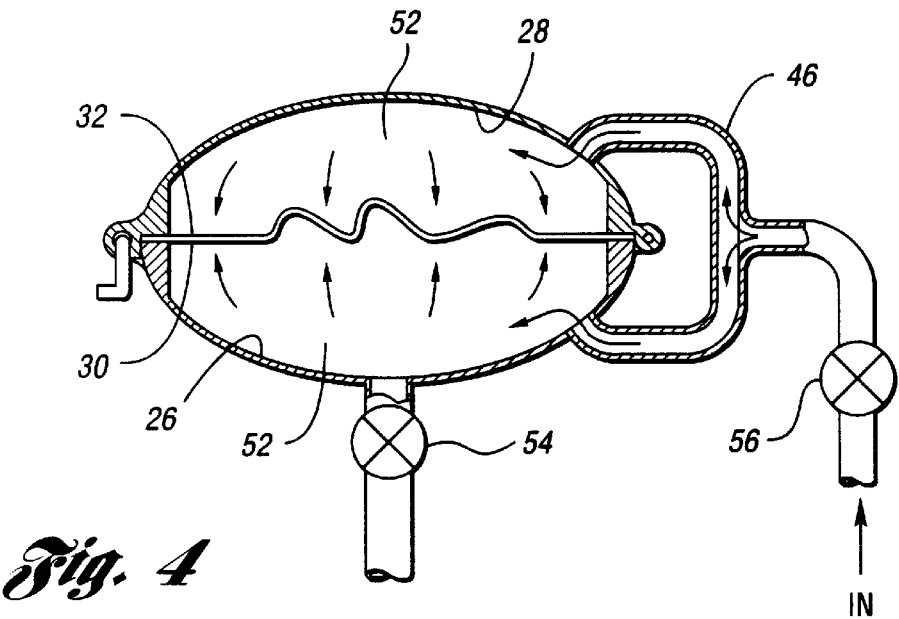
FIG. 4 shows a schematically arranged sectional side view of the pressure vessel of FIG. 2 with the liquid chambers being pressurized.

The present invention has been termed "low pressure hydra molding". This process was developed to reduce the cost of tooling for thermoforming sheet goods, especially for simultaneous bonding of covering material thereon. The invention is, preferably, intended for use with vehicle interior trim panels, but is, of course, applicable to a wide variety of sheet articles to be thermoformed.

Typical sheet plastics to be formed are wood stock, polywood, ABS sheets and flax polypropylene, with a wide variety of cover materials, such as cloth, vinyl, carpet, etc.

The basic principal of the invention is to pressurize equally both sides of a pressure vessel with a low pressure liquid, which also acts as a coolant. The pressure vessel includes thin shell surfaces which are operative to form the part, and which allow even cooling of the part being formed. The present invention is described in greater detail with reference to FIGS. 1–5.

Referring to FIG. 1, an oven 10 is shown for preheating a sheet article 12 prior to thermoforming of the sheet article 12.

Referring to FIG. 2, once the sheet article 12 has been preheated in the oven 10, it is positioned within a pressure vessel 14 for thermoforming. In the preferred embodiment, a cover material 16 is also into the pressure vessel 14, and is positioned by means of the holders 18,20.

The pressure vessel 14 includes first and second vessel halves 22,24, each of which includes a liquid (fluid) chamber 26,28 therein, respectively. The first and second vessel halves 22,24 may comprise a cast aluminum, fabricated steel, fiberglass, carbon fiber composite, etc.

The first and second vessel halves 22,24 also each include a thin shell 30,32 respectively, for forming the sheet article 12 to a desired shape, as defined by the surface configuration of the thin shells 30,32.

The thin shells 30,32 may be comprised of a metal, fiberglass, nickel plated, carbon fiber, cast aluminum, or other material. If the thermoforming is to be performed on a thermoset material, then a metal or ceramic shell will likely be used because it will enhance generation of heat, and a hot oil or steam would be circulated in the fluid chambers 26,28. If the thermoforming is to be performed on a thermoplastic material then a softer shell would be used.

In the preferred embodiment, the thin shells 30,32 are at least partially flexible so that the first and second vessel halves 22,24 can be closed together without forming the part to the desired shape during the closure. This flexibility of the thin shells, 30,32 may be accomplished by providing a flexible diaphragm type configuration around the periphery of the thin shells, 30,32, or merely by forming the thin shells 30,32 of a flexible material.

The first and second vessel halves 22,24 are pivotally connected to one another at the pivot joint 36 to allow opening and closing of the pressure vessel 14. As shown in FIG. 2, the thin shells 30,32 each include first and second surfaces 38, 40, 42, 44, respectively. The first surfaces 38,42 border the liquid chambers 26,28, respectively, and the second surfaces 40,44 are configured to engage and form the sheet article 12 and cover material 16.

Turning to FIG. 3, once the sheet article 12 and cover material 16 have been inserted between the vessel halves, 22,24, the vessel halves 22, 24 are closed together and clamped by the clamp 34. Because the thin shells 30,32 are at least partially flexible, the latch 34 may be engaged while the sheet article 12 and cover material 16 are not yet completely formed to the desired shape. Preferably, the upper thin shell 32 is less flexible because it must support the weight of the liquid above it, and the lower thin shell 30 is comparatively more flexible.

A conduit 46 is configured to provide fluid communication between the first and second liquid chambers 26,28. Feed and return lines 48,50 are provided for feeding and returning liquid 52 to and from the liquid chambers 26,28. Valves 54,56 are provided for controlling such flow.

As illustrated schematically in FIG. 3, a plurality of light, hard fillers 58 are provided in the upper liquid chamber 28 to reduce the volume of liquid in the liquid chamber 28 for weight reduction and ease of handling. The fillers 58 may comprise hard styrofoam blocks, hollow ping-pong ball type structures, or any similar light weight, hard, water resistant object.

The liquid 52 in the liquid chambers 26,28 could comprise water, oil, etc.

Turning to FIG. 4, the inlet valve 56 is then opened and the outlet valve 54 is closed in order to feed the water 52 into both liquid chambers 26, 28. The conduit 46 provides fluid communication between the opposing liquid chambers 26,28 to equalize fluid pressure within the liquid chambers 26,28. Preferably, the liquid pressure is maintained in a low range, approximately 5 to 100 p.s.i. Because of the large surface area of the thin shells, 30,32, a low liquid pressure will generate a tremendous force for forming the sheet article 12 and cover material 16. Because the liquid 52 contacts a major portion of each of the thin shells, 30,32, cooling is greatly enhanced, which substantially reduces cycle time for forming the sheet article 12 and cover material 16. Specifically, the liquid directly contacts the entire surface area of the thin shell which is directly opposite the contoured, part-forming portion of the thin shell. Alternatively, the liquid may be replaced by compressed air for pressurization.

Figure 5:
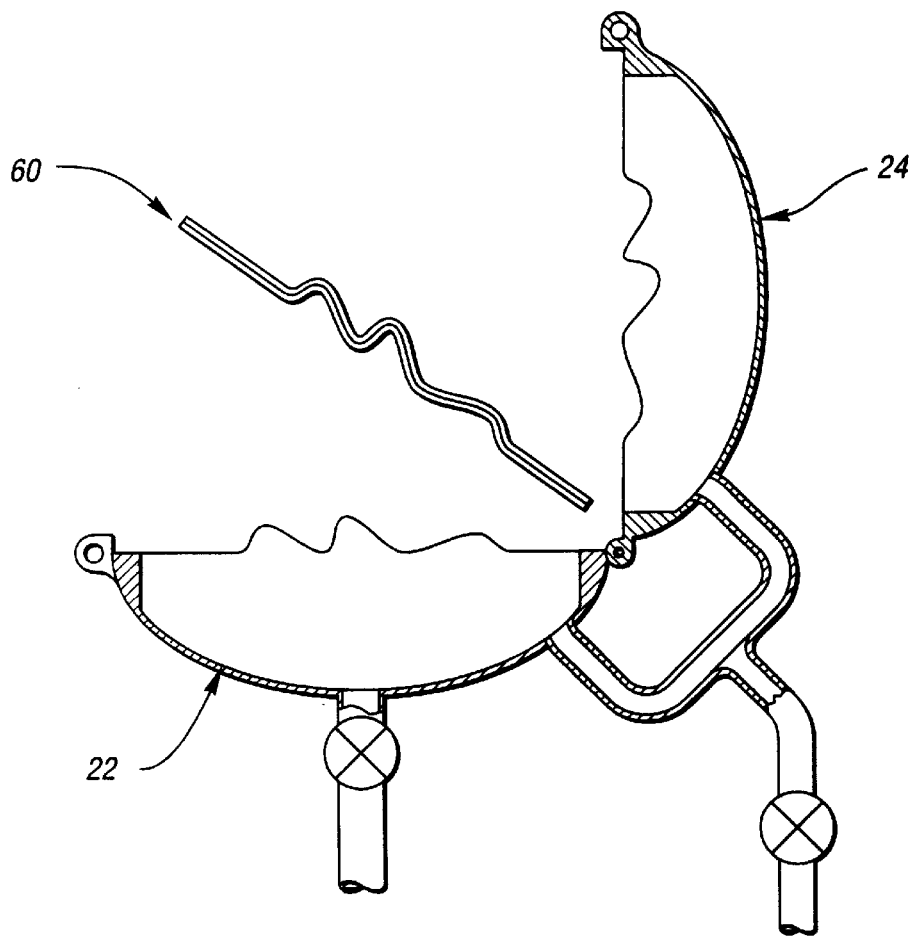
FIG. 5 shows a schematically arranged sectional sideview of the pressure vessel of FIG. 1 with the thermoformed part being removed therefrom.

The force of the pressurized liquid 52 against the shells 30,32 forms the part to the desired shape while the liquid 52 draws heat away from the shells 30,32 to cool the part. After a sufficient period of time, the second vessel half 24 is pivoted away from the vessel half 22 so that the formed part 60 may be removed from the pressure vessel 14, as shown in FIG. 5.

The present invention contemplates that the liquid 52 could be cycled through the liquid chambers 26,28 using a variety of flow sequences, or the liquid could remain stagnant in the liquid chambers 26,28.

Referring back to FIG. 2, removability features 62 are illustrated schematically to show that the thin shells 30,32 are easily interchangeable. Accordingly, when parts of different shape are required, only the thin shells, 30,32 must be replaced and stored. The thin shells 30,32 provide a substantial storage space requirement advantage over prior art compression molding operations, which require storage of large molds.

Of course, the pressure vessel 14 need not be a clam-shell type arrangement as described. Various configurations are contemplated. Also, the conduit 46 could be replaced by appropriate other means for equalizing pressure on opposing sides of the part to be formed, such as feed pumps and pressure sensors. Also, the liquid chambers 26,28 may be partially filled with air to reduce weight.

Accordingly, the present invention provides a lightweight tool which reduces utilities, capital equipment and support equipment costs. Also, hydraulic line cooling chillers are not required. Furthermore, the water pressure supply could come from any existing cooling tower system because only very low pressure is required.

While the best mode for carrying out the invention has been described in detail, those familiar with the art to which this invention relates will recognize various alternative designs and embodiments for practicing the invention within the scope of the appended claims.

What is claimed is:

1. A method of thermoforming a sheet article to a desired shape, comprising:

heating a sheet article to be thermoformed;

inserting the heated sheet article into a pressure vessel having first and second vessel halves, wherein each vessel half includes a fluid chamber and a thin, at least partially flexible shell, and the thin, at least partially flexible shells are configured to cooperate for reforming the sheet article to the desired shape;

closing the pressure vessel such that the sheet article is captured between the thin, at least partially flexible shells without completely reforming the article to the desired shape; and providing fluid of equal pressure in each fluid chamber to force the thin, at least partially flexible shells together to completely reform the sheet article to the desired shape and to simultaneously draw heat away from the thin, at least partially flexible shells through the fluid for cooling the sheet article as the sheet article is reformed.

2. The method of claim 1, wherein said step of providing fluid of equal pressure in each fluid chamber comprises providing liquid in each fluid chamber at a pressure of less than 100 p.s.i.

3. The method of claim 2, wherein said step of providing liquid of equal pressure in each fluid chamber comprises communicating the fluid chambers to equalize pressure therebetween.

4. The method of claim 1, further comprising applying a cover material over the sheet article prior to said closing of the pressure vessel.

5. The method of claim 2, further comprising providing a plurality of light, hard fillers in one of said fluid chambers to reduce the volume of liquid in the respective vessel half for weight reduction to ease opening and closing of the vessel.

6. The method of claim 1, wherein said step of providing fluid comprises providing water.

7. The method of claim 1, wherein said step of closing the vessel comprises latching the vessel to allow pressurization.

8. The method of claim 1, further comprising providing a flexible diaphragm around the periphery of the thin shells to enable flexing of the thin shells as the pressure vessel is closed prior to providing fluid of equal pressure.

* * * * *